Sept. 10, 1929.  W. E. JOHNSON  1,727,885
AUTOMATIC TRANSMISSION
Original Filed Nov. 12, 1923  2 Sheets-Sheet 1

Witness:
R Burkhardt

Inventor:
William E. Johnson,
By Cromwell, Greist + Warden
attys.

Sept. 10, 1929.　　　W. E. JOHNSON　　　1,727,885
AUTOMATIC TRANSMISSION
Original Filed Nov. 12, 1923　　2 Sheets-Sheet 2
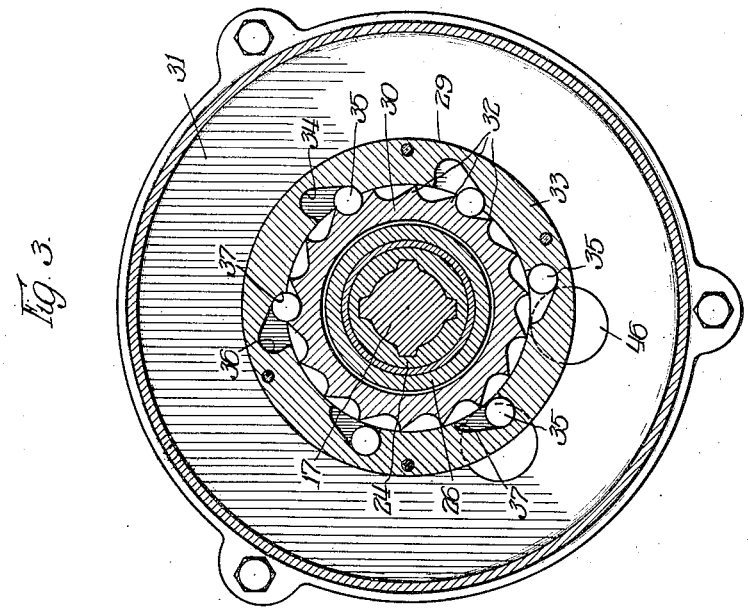
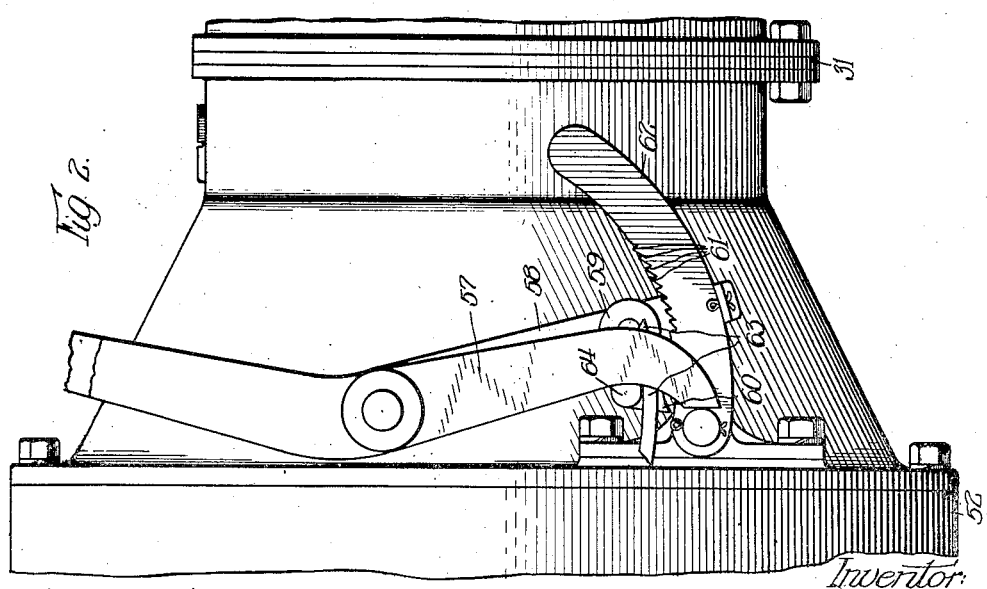
Witness:
R. Burkhardt
Inventor:
William E. Johnson,
By Cromwell, Greist & Warden
Attys.

Patented Sept. 10, 1929.

1,727,885

UNITED STATES PATENT OFFICE.

WILLIAM E. JOHNSON, OF CHICAGO, ILLINOIS, ASSIGNOR TO FLEXO-DRIVE CORPORATION, OF CHICAGO, ILLINOIS, A CORPORATION OF ILLINOIS.

AUTOMATIC TRANSMISSION.

Application filed November 12, 1923, Serial No. 674,157. Renewed June 20, 1929.

The invention relates to power transmitting mechanisms and is particularly concerned with automatic vehicle transmissions.

The main and primary object of the invention is to provide a novel vehicle transmission which operates automatically under a multiplication of torque to vary the ratio of speed transmission, which requires no manual actuation as a prerequisite to the automatic operation, which is non-stallable under all conditions of service, and which prevents racing of the associated motor.

Another important object is to provide, for use in such a transmission, a novel back-stop device which prevents retrograde movement of an element while freely permitting advance movement of the same, which is so constructed as to eliminate therein crushing interlocks with their resulting undesirable effects, and which is noiseless and frictionless in its operation.

Still another important object is to provide, for use in association with such a transmission, a device for controlling the operation of the emergency brake of the vehicle by the operation of the service brake of the vehicle.

Other objects and advantages of the invention not specifically referred to will be appreciated upon an understanding of the nature of the same as disclosed in the following detailed description and accompanying drawings wherein is presented what is now considered to be a preferred embodiment of the invention.

Obviously the invention is susceptible of modification in unessential details of construction and arrangement; wherefore the particular embodiment presented for the purpose of exemplification is not intended to restrict the spirit of the invention or limit unnecessarily the scope of the appended claims.

In the drawings,

Fig. 2 is a side elevation of the front portion of the transmission casing, illustrating the device associated with the service and emergency brakes; and Fig. 3 is a vertical transverse section through the transmission taken on the line 3—3 of Fig. 1, illustrating the back-stop device.

Figure 1:
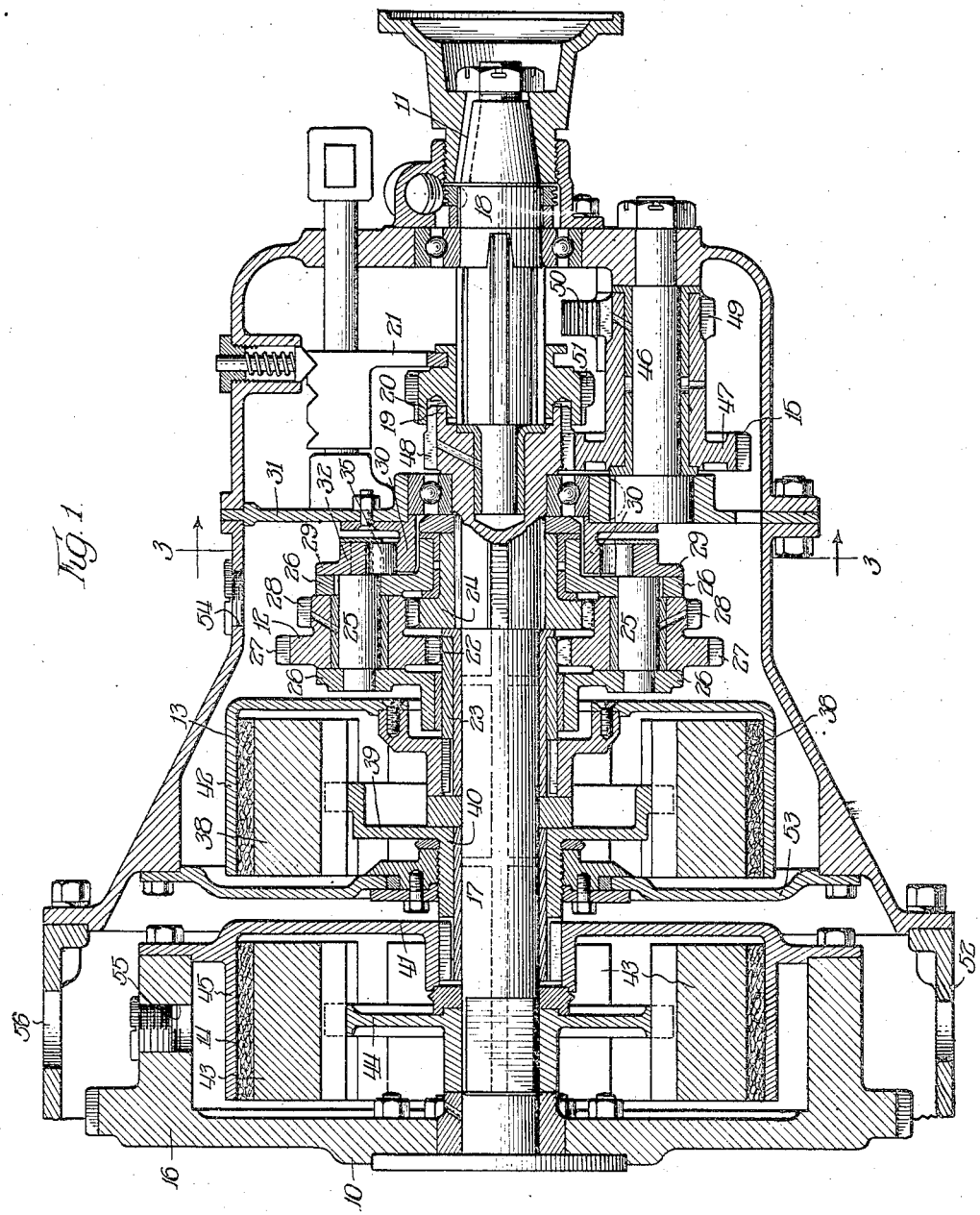
Fig. 1 is a vertical longitudinal section taken through the center of the transmission.

It will be observed in the drawings that the automatic vehicle transmission of the invention is saliently characterized by a driving element 10 adapted for connection with a motor, a driven element 11 adapted for connection with a propeller shaft, gearing 12 operative under certain conditions to effect a reduction between the driving element 10 and the driven element 11, a centrifugally operated connection 13 between the driving element 10 and the gearing 12 controlled by the speed of rotation of the driving element and effective as a connection only above a certain speed of that element, a centrifugally operated connection 14 between the driving element 10 and the driven element 11 controlled by the speed of rotation of the driven element and effective as a connection only above a certain speed of that element, and gearing 15 operative upon manual actuation to effect a reversal in rotation between the two portions of the driven element 11.

The driving element 10 is essentially a member in fixed association with the prime mover of the motor, and may, for compactness, be embodied in the usual fly wheel 16 of the motor.

The driven element 11 consists of two shaft portions 17 and 18. The shaft portion 17 extends rearwardly from the fly wheel 16 and is provided at its rear end with a rearwardly facing jaw clutch 19; and the shaft portion 18 extends rearwardly from the shaft portion 17 and is provided at its front end with a forwardly facing and axially slidable jaw clutch 20 for interlocking co-action with the jaw clutch 19 whereby to connect the two shaft portions 17 and 18 for rotation as a unit upon manual actuation of the jaw clutch 20 with a shift yoke 21.

The gearing 12 consists of a small gear 22 which is formed on the rear end of a sleeve 23 journaled for rotation intermediate the ends of the shaft portion 17, a large gear 24 which is splined to the shaft portion 17 adjacent the rear end of the same, two planet shafts 25 which are journaled on opposite sides of the shaft portion 17 in bearings carried by a bracket 26 journaled at its center upon the sleeve 23, two large gears 27 which are journaled on the two planet shafts 25 and mesh at opposite sides with the small gear 22, two small gears 28 which are journaled on the two planet shafts 25 in fixed preferably integral association with the two gears 27 and mesh at opposite sides with the large gear 24, and a stop device 29 which is associated with the bracket 26 for preventing rotation of the bracket in a reverse direction relative to the direction of rotation of the driving element while freely permitting rotation of the bracket in a forward direction. The stop device 29, which is clearly illustrated in Fig. 3, consists of an annulus 30 which is fixedly secured to a vertical webbing 31 in the transmission casing and is provided about its outer periphery with a plurality of outwardly extending curved teeth 32, an annulus 33 which is fixedly secured to the bracket 26 about the annulus 30 and is provided about its inner periphery with a plurality of pockets 34, and a plurality of rollers 35 which are adapted to be housed within deep cup portions 36 of the pockets 34 when the bracket 26, together with the annulus 33, is rotating in a forward direction, and which are adapted to drop inwardly toward the annulus 30 and engage with the teeth 32 of the same when the bracket 26, together with the annulus 33, ceases its forward rotation, whereby to provide a plurality of interlocks between the curved teeth 32 and curved shallow portions 37 of the pockets 34.

The centrifugally operated connection 13 between the driving element 10 and the gearing 12 consists of a plurality of radially movable weight members 38 which are lined with friction material and are mounted in suitable guides formed in an outwardly extending bracket portion 39 of a sleeve 40 splined to a webbing 41 fixedly secured to the rear hollowed face of the fly wheel 16, and a friction drum 42 which encompasses the weight members 38 and is splined to the forward end of the sleeve 23 carrying the small gear 22. The weight members 38 travel about the axis of the transmission in unison with the driving element 10, and will be thrown outwardly under centrifugal force into frictional co-action with the drum 42 when the driving element is rotated at any speed above an idling speed. The co-acting friction surfaces of the weight members 38 and the drum 42 are properly lubricated to permit of continued sliding engagement therebetween in the event that the load resistance at the drum 42, as applied in modified amount to the drum through the reduction provided by the gearing 12, is in excess of the torque at the drum which the associated motor efficiently develops at any particular speed.

The centrifugally operated connection 14 between the driving element 10 and the driven element 11 consists of a plurality of radially movable weight members 43 which are lined with friction material and are mounted in suitable guides formed in an outwardly extending bracket 44 splined to the front end of the shaft portion 17, and a friction drum 45 which encompasses the weight members 43 and is formed within the hollowed portion of the fly wheel 16 as a forward extension of the webbing 41. The weight members 43 travel about the axis of the transmission in unison with the driven element 11 and will be thrown outwardly under centrifugal force into frictional co-action with the more swiftly moving drum 45 rotating with the driving element 10 when the driven element is rotated at a sufficient speed by the driving element through the reduction provided by the gearing 12. The co-acting frictional surfaces of the weight members 43 and the drum 45 are properly lubricated to permit of continued sliding engagement therebetween until the speed of the driven element is sufficient to throw the weight members outwardly with enough force to effect an ultimate static engagement of the same with the drum 45.

The gearing 15 consists of a counter-shaft 46 which is journaled at the lower rear portion of the transmission casing, a sleeve on the counter-shaft which is provided, at its front end, with a large gear in mesh with a gear 48 on the rear end of the shaft portion 17, and, at its rear end, with a small gear 49 adapted to mesh with a suitably journaled idler gear 50 which in turn is adapted to mesh with a gear 51 on the outer periphery of the clutch 20 when the clutch is shifted rearwardly from its interlocked position with the jaw clutch 19 past its neutral position into its reversing position in meshed relation with the gear 50.

The transmission casing is secured to and extends rearwardly from the rear end of the crank casing 52 of the motor. The transmission casing is oil-tight and is closed off at its forward end from the crank casing 52 by a vertical webbing 53. The centrifugal weight members 38, the drum 42 and the various gears of the transmission are all adapted to operate in oil, and the transmission casing is accordingly provided with a suitable covered oil-filling aperture 54. The centrifugal weight members 43 and the drum 45 are likewise adapted to operated in oil, and the webbing 41 serves to provide an oil-tight closure for the hollowed portion of the fly wheel wherein the weight members and the drum are contained. A suitably covered oil-filling aperture 55 is provided in the periphery of the fly wheel 16 in alignment with a larger aperture 56 in the crank casing through which access may easily be had to the aperture 55 for filling.

The service and emergency brake pedals 57 and 58 of the associated vehicle may conveniently be pivotally mounted upon the side of the transmission casing as shown in Fig 2. The emergency brake 58 is provided adjacent its lower end with a pivoted pawl 59 which is provided at its forward free end with a tooth 60 for engagement with any one of the ratchet teeth 61 formed on a curved bracket 62. The service brake pedal 57 is provided with a tripping blade 63 which is adapted, when the emergency brake pedal 58 is locked in its operative position by the pawl 59, to trip the pawl by engagement with a lug 64 on the pawl. It will be understood from this construction that when the emergency brake pedal is depressed, the same will remain in its operative position until released by a depression of the service brake pedal 57.

The operation of the transmission is as follows:

Under ordinary conditions of service, the jaw clutches 19 and 20 are intended to remain in interlocked engagement as shown in Fig. 1 whereby to cause the two shaft portions of the driven element to rotate as a unit. Whenever the driving element 10 of the transmission is rotating at an idling speed or less, there will be no transmission of power through the transmission for the reason that the weight members 38 will not be thrown outwardly with sufficient centrifugal force against the drum 42 to frictionally engage with the same. Accordingly no separation of the jaw clutches 19 and 20 is necessary when it is desired that the driven element 11 be at rest, and the usual friction clutch heretofore employed in all forms of transmissions is also wholly unnecessary.

Whenever the speed of the driving element 10 is accelerated above an idling speed, the weight members 38 will frictionally engage with the drum 42 and will gradually bring the drum into synchronous rotation with the same, in which condition, it will be appreciated, the driven element will be rotated from the driving element through reduction which corresponds in a general way to what as known as the "low" gear ratio in ordinary transmissions. If the speed of the driving element under these conditions is sufficient to rotate the driven element at a speed sufficient to overcome the inertia of the resistance, the weight members 43 rotating with the driven element will be accelerated in rotation by the more rapidly rotating drum 45 and will gradually bring the speed of the driven element up to that of the speed of the driving element, whereupon the transmission will operate in a one-to-one ratio with all parts moving as a unit about the axis of the transmission.

If the load resistance for any reason increases to an amount in excess of that which the motor will efficiently develop in torque, the weight members 43 will break their static frictional engagement with the drum 45 and the then forwardly rotating bracket 26 will gradually return to a stationary position, whereupon the transmission will deliver the torque developed by the motor to the driven element through the reduction provided by the gearing 12.

The transmission, while adapted to operate under a multiplication of torque against excessive load resistance, is non-stallable under all conditions. If the driven element is held against rotation, it will be appreciated that the driving element will be retarded only to an idling speed of the motor since no transmission of power to the driven element is had and no load is accordingly imposed upon the driven element at an idling speed of the motor.

I claim:

1. In a flexible power transmission, a rotary driving element, a rotary driven element, means operative under certain conditions to effect a reduction between the said elements, a connection between the driving element and the said means controlled by the speed of rotation of the driving element and effective only above a certain speed of that element, a connection between the said means and the driven element, and a connection between the driving element and the driven element controlled by the speed of rotation of the driven element and effective only above a certain speed of that element.

2. In a flexible power transmission, a rotary driving element, a rotary driven element, gearing operative under certain conditions to effect a reduction between the said elements, a centrifugally operated connection between the driving element and the said gearing controlled by the speed of rotation of the driving element and effective only above a certain speed of that element, a connection between the said gearing and the driven element, and a centrifugally operated connection between the driving element and the driven element controlled by the speed of rotation of the driven element and effective only above a certain speed of that element.

3. In a flexible power transmission, a rotary driving element, a rotary driven element, two fixedly associated planet gears revolvable about the axis of the transmission, means to prevent the planet gears from revolving about the axis of the transmission in a reverse direction, a small gear journaled for rotation about the axis of the transmission and meshing with one of the planet gears, a large gear connected with the driven element and meshing with the other of the planet gears, a connection between the said small gear and the driving element operative only above a certain speed of the driving element, and a connection between the driving element and the driven element operative only above a certain speed of the driven element.

4. In a flexible power transmission, a rotary driving element, a rotary driven element, two fixedly associated planet gears of different sizes revolvable about the axis of the transmission, means to prevent the planet gears from revolving about the axis of the transmission in a reverse direction, a small gear journaled for rotation about the axis of the transmission and meshing with one of the planet gears, a large gear connected with the driven element and meshing with the other of the planet gears, a centrifugally operated connection between the said small gear and the driving element controlled by the speed of rotation of the driving element and operative only above a certain speed of that element, and a centrifugally operated connection between the driving element and the driven element controlled by the speed of rotation of the driven element and operative only above a certain speed of that element.

5. In a flexible power transmission, a rotary driving element, a rotary driven element, two fixedly associated planet gears of different sizes revolvable about the axis of the transmission, a back-stop device to prevent the planet gears from revolving about the axis of the transmission in a reverse direction, a small gear journaled for rotation about the axis of the transmission and meshing with one of the planet gears, a large gear connected with the driven element and meshing with the other of the planet gears, a drum connected with the said small gear, a plurality of centrifugally operated weight members connected for rotation with the driving element and operative to frictionally engage with the drum only above a certain speed of that element, and a connection between the driving element and the driven element operative only above a certain speed of the driven element.

6. In a flexible power transmission, a rotary driving element, a rotary driven element, two fixedly associated planet gears of different sizes revolvable about the axis of the transmission, a back-stop device to prevent the planet gears from revolving about the axis of the transmission in a reverse direction, a small gear journaled for rotation about the axis of the transmission and meshing with one of the planet gears, a large gear connected with the driven element and meshing with the other of the planet gears, a connection between the said small gear and the driving element operative only above a certain speed of that element, a drum connected for rotation with the driving element, and a plurality of centrifugally operated weight members connected for rotation with the driven element and operative to frictionally engage with the drum only above a certain speed of the driven element.

In testimony whereof I have hereunto set my hand.

WILLIAM E. JOHNSON.